Feb. 29, 1944.   C. B. LINN   2,342,677
ALKYLATION OF ISOPARAFFINS
Filed Nov. 16, 1942
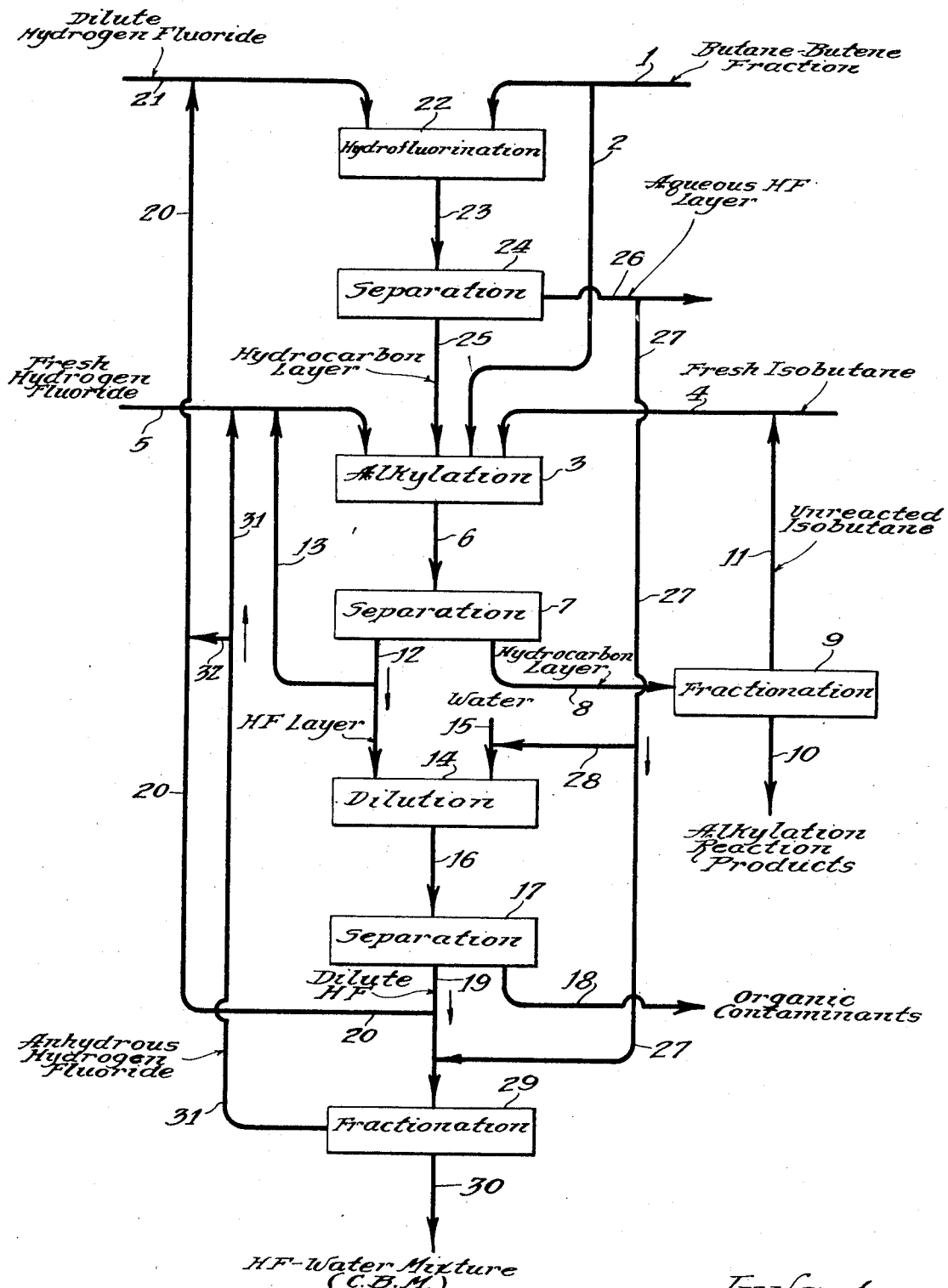
Inventor:
Carl B. Linn.
By: Lee J. Gary
Attorney.

Patented Feb. 29, 1944

2,342,677

UNITED STATES PATENT OFFICE 2,342,677

ALKYLATION OF ISOPARAFFINS

Carl B. Linn, Riverside, Ill., assignor to Universal Oil Products Company, Chicago, Ill., a corporation of Delaware Application November 16, 1942, Serial No. 465,692

18 Claims. (Cl. 260—683.4)

This application is a continuation-in-part of my co-pending application Serial No. 402,273 filed July 14, 1941.

This invention relates to the alkylation of paraffinic hydrocarbons. It is more specifically concerned with a process for the production of high antiknock motor fuel in which isoparaffins, particularly isobutane and isopentane, and mono olefinic hydrocarbons, particularly those having 3, 4, and 5 carbon atoms per molecule, are effectively converted into higher molecular weight hydrocarbons of gasoline boiling range in the presence of a hydrogen fluoride catalyst.

The invention also involves a novel method for the regeneration of the used catalyst whereby purified hydrogen fluoride is recovered and returned to the alkylation step of the process.

In one broad embodiment the present invention relates to a method of regenerating contaminated hydrogen fluoride catalyst from an isoparaffin-olefin alkylation process which comprises diluting said contaminated catalyst with water whereby to separate organic contaminants from an aqueous hydrogen fluoride layer, withdrawing said organic contaminants from the system, reacting said aqueous hydrogen fluoride with olefins under hydrofluorinating conditions whereby to convert a substantial amount of said hydrogen fluoride to alkyl fluorides, and returning said alkyl fluorides to the alkylation step.

In a more specific embodiment the invention relates to a process for effecting the alkylation of paraffinic hydrocarbons which comprises the steps of reacting olefinic hydrocarbons with isoparaffinic hydrocarbons under alkylating conditions in the presence of a hydrogen fluoride catalyst, separating hydrocarbon reaction products from the bulk of the used hydrogen fluoride catalyst, fractionating said hydrocarbon reaction products to recover desired alkylation products, diluting at least a portion of said separated used hydrogen fluoride catalyst with water whereby to separate organic contaminants from aqueous hydrogen fluoride, withdrawing said organic contaminants from the system, reacting at least a portion of said aqueous hydrogen fluoride with olefinic hydrocarbons under hydrofluorinating conditions whereby to form alkyl fluorides, and introducing said alkyl fluorides into said first named alkylation step whereby free hydrogen fluoride is produced by the interaction of said isoparaffinic hydrocarbons and said alkyl halides.

When concentrated or nearly anhydrous hydrogen fluoride is employed as the active catalytic agent in the alkylation of hydrocarbons in a continuous operation wherein used catalyst is separated from the hydrocarbon reaction products in a settling zone and returned to the alkylation zone, the catalyst phase gradually becomes contaminated with an organic fluorine-containing polymer-like material. When excessive contamination of the catalyst occurs, it is necessary to withdraw at least a portion of the used catalyst from the system to be replaced by purified or fresh hydrogen fluoride. The present invention consists essentially of a method of regenerating the used catalyst by diluting the contaminated catalyst with sufficient water to disengage the organic contaminants followed by conversion of the purified aqueous hydrogen fluoride to alkyl fluorides which may be returned to the alkylation step. When one molecule of alkyl fluoride reacts with a molecule of isoparaffin in the alkylation zone, one molecule of hydrogen fluoride is generated in situ as shown by the following equation:

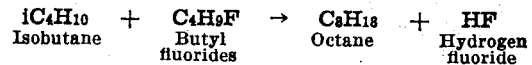
Isobutane   Butyl      Octane   Hydrogen
            fluorides            fluoride The regeneration method of this invention may be applied to a conventional isoparaffin-olefin alkylation process using a hydrogen fluoride catalyst, or it may also be incorporated into a two-stage alkylation process involving the following steps: (1) the hydrofluorination of olefins with hydrogen fluoride to form alkyl fluorides, and (2) the reaction of isoparaffins with said alkyl fluorides in the presence of a hydrogen fluoride catalyst to form higher molecular weight isoparaffinic hydrocarbons.

The hydrofluorination of olefins in the first step of the above mentioned two-stage process may be conveniently carried out by employing the dilute or aqueous hydrogen fluoride obtained in the regeneration method of the present invention. Although concentrated or nearly anhydrous hydrogen fluoride may be reacted with olefins to form alkyl fluorides at a temperature of from about —60 to about 100° C., or preferably from about —30 to about 0° C., it has been determined that more selective hydrofluorination is obtained when aqueous hydrogen fluoride is employed, especially in the case of solutions containing from about 60 to about 80 weight per cent hydrogen fluoride. The use of aqueous hydrogen fluoride minimizes to a considerable extent the loss of olefins by polymerization. It is preferable to employ a substantial molecular excess of hydrogen fluoride over olefins in the hydrofluorination step, and the reaction is also preferably conducted under sufficient pressure to insure substantially liquid phase operation. Somewhat higher temperatures may be employed in the hydrofluorination step when dilute hydrogen fluoride is used, e. g., from about −30 to about 100° C.

The alkylation of an isoparaffin, such as isobutane, with an olefin or an alkyl fluoride in the presence of a hydrogen fluoride catalyst may be carried out at a temperature of from about −30 to about 100° C. and more preferably from about 0 to about 50° C. Pressure has been found to have little effect on the reaction but it should preferably be sufficient to compensate for the vapor pressure of the reactants and maintain in liquid phase a substantial portion of the reactants and catalyst. By carrying out the alkylation reaction so that a molar excess of isoparaffin over olefins and/or alkyl fluorides is present, for example, a molar ratio of from about 2:1 to about 20:1 or higher, the formation of polymers is substantially avoided with the result that there is a selectively high conversion of the reactants into alkylated paraffinic hydrocarbons. The time factor in the alkylation step may be conveniently expressed in terms of "space time" which is defined as the volumes of liquid catalyst in the alkylation zone divided by the liquid volume charge rate per minute of hydrocarbon reactants. The "space time" may vary from about 5 to about 80 minutes although the exact value chosen will depend upon the nature of the charging stock, the other operating variables, etc. In certain cases, it may be desirable to extend this range in either direction.

The drawing illustrates diagrammatically a flow sheet of the steps involved in one embodiment of the present invention. The details of the apparatus which may be used in each of the steps have not been shown since it is believed that these features are well-known to those skilled in the alkylation art.

Referring to the drawing, zone 3 represents a conventional alkylation reaction zone which may be mechanically agitated mixing zone or other form of apparatus wherein intimate contact can be obtained between the catalyst and hydrocarbon reactants. A butane-butene fraction is introduced through line 1 and line 2 into alkylation zone 3. The isoparaffinic reactant which, in this case may comprise isobutane, is charged through line 4 to the alkylation zone 3. Hydrogen fluoride catalyst is introduced by means of line 5. The total reaction mixture or hydrocarbon-catalyst emulsion or any desired portion thereof passes through line 6 to separation zone 7 which ordinarily comprises a simple gravity settler. The upper hydrocarbon reaction products layer from zone 7 is withdrawn through line 8 and introduced into fractionation zone 9 which ordinarily will comprise a plurality of fractionators wherein desired alkylation products may be separated from undesired products and unconverted reactants. The alkylation reaction products along with unconverted normal butane are removed through line 10, and unreacted isobutane is recycled by means of line 11 and line 4 to the alkylation zone 3. Propane or other light gases may be withdrawn from the system by means not shown. The lower used hydrogen fluoride catalyst layer is withdrawn from settling zone 7 through line 12 and a substantial portion thereof is preferably recycled through line 13 to line 5 and then to the alkylation zone 3. A portion of this used catalyst, however, is passed continuously or intermittently through line 12 to a catalyst recovery step hereinafter described in greater detail.

During the course of the reaction in alkylation zone 3 the catalyst phase gradually becomes contaminated with an organic or hydrocarbonaceous contaminant as hereinbefore described. In order to avoid excessive dilution of the catalyst with organic contaminants a portion of the used catalyst must be continuously or intermittently removed from the alkylation system and replaced with purified hydrogen fluoride. The used catalyst to be regenerated is introduced through line 12 into a mixing or dilution zone 14 wherein water is added through line 15. The hydrogen fluoride catalyst is preferably diluted to the extent that an aqueous hydrogen fluoride solution is obtained which contains from about 60 to about 80% by weight of hydrogen fluoride. The step of diluting the contaminated hydrogen fluoride causes the hydrocarbonaceous contaminants to separate out, and when the aqueous mixture is passed through line 16 to a settling zone 17 the organic contaminant layer may be readily withdrawn through line 18. The aqueous hydrogen fluoride layer is withdrawn through line 19 and may be treated by any of several alternative procedures.

A portion or all of the dilute hydrogen fluoride is introduced by means of line 20 and line 21 into a hydrofluorination zone 22. Additional quantities of dilute hydrogen fluoride may be added from an extraneous source through line 21 if desired. Olefinic hydrocarbons, in this case a portion of the butane-butene fraction hereinbefore referred to, are introduced by means of line 1 into zone 22. It will be apparent that an olefin-containing fraction from any other convenient source may be employed in zone 22 with substantially the same results. In the hydrofluorination zone 22, the aqueous hydrogen fluoride (preferably of 60 to 80% concentration) reacts with the butenes or other olefins introduced thereto to form alkyl fluorides. The total reaction products from the hydrofluorination zone 22 are passed through line 23 to a separation zone 24 which may conveniently comprise a settling zone. The alkyl fluorides are predominantly soluble in the hydrocarbon layer, i. e., the unconverted paraffins or other hydrocarbons which were introduced into zone 22 as components of the butane-butene fraction or other olefin-containing fraction charged thereto. The hydrocarbon layer from zone 24 comprising alkyl fluorides dissolved in unconverted hydrocarbons is charged to the alkylation zone 3. The isobutane charged to alkylation zone 3 is, therefore, alkylated with alkyl fluorides introduced from line 25 and also with olefins introduced from line 2. During the reaction of the alkyl fluorides with isoparaffins, hydrogen fluoride is generated in situ and becomes available as a catalyst for the alkylation reaction as hereinbefore described. The aqueous layer from separation zone 24 is withdrawn through line 26 and is preferably passed by means of line 27 and line 28 to the dilution zone 14. In many cases this aqueous layer may contain appreciable quantities of unconverted hydrogen fluoride.

If desired a portion of the dilute hydrogen fluoride layer withdrawn from zone 17 through line 19 may be introduced into a fractionation zone 29 wherein anhydrous hydrogen fluoride is distilled overhead from a hydrogen fluoride-water mixture having a lower hydrogen fluoride concentration which may be withdrawn through line 30. This mixture will ordinarily comprise a constant boiling mixture which contains approximately 35 to 40 weight per cent of hydrogen fluoride at about atmospheric pressure. The overhead distillate of substantially anhydrous hydrogen fluoride may be passed through line 31 to line 5 and thus to alkylation zone 3. If desired, a portion of the anhydrous hydrogen fluoride may be diverted through line 32 to line 20 and thus introduced into the hydrofluorination zone 22. This alternative provides a means for controlling the hydrogen fluoride concentration of the aqueous hydrogen fluoride introduced into zone 22. In the event that the aqueous layer from separation zone 24 contains appreciable quantities of unconverted hydrogen fluoride, it may be desirable to pass a portion of this layer directly through line 26 and line 27 to line 19 and thence into fractionation zone 29 for recovery of anhydrous hydrogen fluoride.

The term hydrogen fluoride catalyst as used throughout this specification and appended claims is intended to include those catalysts whose essential active ingredient is hydrogen fluoride. Thus it is within the scope of my invention to have as much as from about 10 to about 15% water present in the hydrogen fluoride alkylation catalyst. Excessive dilution with water, however, is undesirable since it is detrimental to the alkylating activity of the catalyst. It is also within the scope of the invention to have present relatively minor amounts of other diluents, additives, or promoters, for example, boron trifluoride, which may alter the catalyst activity. In the case of the alkylation of isoparaffins with ethylene it is highly desirable to employ a catalyst containing both hydrogen fluoride and boron trifluoride since hydrogen fluoride alone is not highly effective in this reaction.

The following example is introduced as representative of results which may be attained by the present invention although it is not intended to place undue limitations on the generally broad scope of the invention:

In a process substantially as illustrated in the drawing, an isobutane-rich fraction and a $C_4$ hydrocarbon fraction containing about 30 mol per cent of butenes are commingled to form a combined hydrocarbon feed having a molal ratio of isobutane to butenes of 6:1. This charging stock is contacted in a mechanically agitated alkylation zone with a hydrogen fluoride catalyst comprising used catalyst recycled from a separation zone hereinafter described and a small amount of added anhydrous hydrogen fluoride. The catalyst phase contains, on a weight basis, approximately 80% free hydrogen fluoride, 2% water and 18% of an organic contaminant or diluent which is formed during the alkylation process. The agitation zone is cooled by suitable means to remove the exothermic heat of reaction and the temperature is maintained at approximately 38° C. under a pressure of about 150 pounds per square inch which is sufficient to maintain the catalyst and reactants in substantially the liquid phase. A "space time" of 30 minutes is utilized.

A portion of the reaction mixture is continuously introduced into a settling zone from which an upper hydrocarbon reaction products layer is withdrawn to a fractionation step wherein alkylation products, normal butane, and light gases are recovered and unconverted isobutane is recycled to the alkylation step. The lower used catalyst layer is largely recycled from the settling zone to the alkylation zone, but a portion thereof is introduced into a mixing zone wherein sufficient water is added to the used catalyst to obtain an aqueous hydrogen fluoride solution containing approximately 70% by weight of hydrogen fluoride. The dilution step causes the organic contaminants in the used catalyst to separate out into a distinct layer which is withdrawn from the system.

The 70% aqueous hydrogen fluoride layer from the dilution step is reacted in a separate mechanically agitated reaction zone with a portion of the $C_4$ hydrocarbon fraction hereinbefore described. This hydrofluorination step is conducted at a temperature of about 10° C. under sufficient pressure to maintain substantially the liquid phase and in the presence of a substantial molar excess of hydrogen fluoride over butenes. Appreciable amounts of the hydrogen fluoride contained in the aqueous hydrogen fluoride solution are converted to butyl fluorides by reaction with the butenes in the $C_4$ hydrocarbon fraction. The reaction mixture from the hydro-fluorination step is introduced into a settling zone, and a hydrocarbon layer comprising essentially unreacted paraffins and dissolved butyl fluorides is separated and introduced into the alkylation zone hereinbefore described. The remaining aqueous layer which may contain minor amounts of unconverted hydrogen fluoride is preferably used for diluting the contaminated catalyst in the dilution step hereinbefore described.

In the fractionation of the reaction products, a branched chain isoparaffinic alkylate is recovered in a yield of about 190 weight per cent based on the butenes charged to the process. The volumetric ratio of $$\frac{\text{catalyst regenerated}}{\text{alkylate produced}}$$

is approximately 1:20. It will be apparent however that this ratio may be varied within rather broad limits, for example, from about 1:10 to about 1:100 dependent upon the nature of the charging stock, operating conditions, etc. Although this illustration has been described in connection with the alkylation of isobutane with butylenes, it should be apparent that the process is equally applicable to other isoparaffins and to other olefins.

I claim as my invention:

1. In the alkylation of isoparaffinic hydrocarbons in the presence of a hydrogen fluoride catalyst, the method of regenerating resulting contaminated catalyst which comprises diluting said contaminated catalyst with water to cause separation of a layer of organic contaminants from an aqueous hydrogen fluoride layer, withdrawing said organic contaminants from the system, reacting said aqueous hydrogen fluoride with olefins to form alkyl fluorides, and returning said alkyl fluorides to the alkylation zone.

2. A process for the regeneration of contaminated hydrogen fluoride catalyst obtained from an isoparaffin-olefin alkylation process which comprises diluting said contaminated catalyst with sufficient water to cause the separation of organic contaminants from aqueous hydrogen fluoride, withdrawing said organic contaminants from the system, reacting said aqueous hydrogen fluoride with olefinic hydrocarbons under hydrofluorinating conditions to convert a substantial amount of said hydrogen fluoride to alkyl fluorides, and returning said alkyl fluorides to the alkylation step to cause isoparaffins therein to react with the alkyl fluorides to form alkylated products and to release free hydrogen fluoride in situ.

3. A process for the alkylation of paraffinic hydrocarbons to produce higher molecular weight derivatives thereof which comprises the steps of reacting olefinic hydrocarbons with isoparaffinic hydrocarbons under alkylating conditions in the presence of a hydrogen fluoride catalyst, separating hydrocarbon reaction products from the bulk of the used hydrogen fluoride catalyst, diluting at least a portion of said separated used hydrogen fluoride catalyst with water whereby to separate organic contaminants from aqueous hydrogen fluoride, withdrawing said organic contaminants from the system, reacting at least a portion of said aqueous hydrogen fluoride with olefinic hydrocarbons under hydrofluorinating conditions whereby to form alkyl fluorides, and introducing said alkyl fluorides into said first named alkylation step to produce free hydrogen fluoride by the interaction of said isoparaffinic hydrocarbons and said alkyl halides.

4. A process for the production of saturated motor fuel which comprises reacting isoparaffinic hydrocarbons with mono olefins under alkylating conditions in the presence of a catalyst whose essential active ingredient is hydrogen fluoride, separating hydrocarbon reaction products from the bulk of the used hydrogen fluoride catalyst, recycling unconverted isoparaffins to the alkylation step, recycling at least a portion of said separated used hydrogen fluoride catalyst to the alkylation step and diluting another portion with water to cause separation of organic contaminants from aqueous hydrogen fluoride, reacting at least a portion of said aqueous hydrogen fluoride with mono olefinic hydrocarbons under hydrofluorinating conditions to form alkyl fluorides, and introducing said alkyl fluorides into said first named alkylation step to produce free hydrogen fluoride by the interaction of said isoparaffinic hydrocarbons with said alkyl halides.

5. In a process for the alkylation of isoparaffinic hydrocarbons wherein olefins are reacted with hydrogen fluoride under hydrofluorinating conditions in a first stage and the alkyl fluorides thus formed are then reacted with isoparaffins in a second stage under alkylating conditions and in the presence of a hydrogen fluoride catalyst, the improvement which comprises employing aqueous hydrogen fluoride containing from about 60 to about 80% by weight of hydrogen fluoride in said hydrofluorination step whereby to substantially avoid polymerization of olefins.

6. A process for the alkylation of isoparaffinic hydrocarbons which comprises reacting olefinic hydrocarbons with aqueous hydrogen fluoride containing from about 60 to about 80% by weight of hydrogen fluoride under hydrofluorinating conditions in a first reaction zone, recovering alkyl fluorides produced in said first reaction zone and reacting said alkyl fluorides with isoparaffinic hydrocarbons under alkylating conditions in the presence of a hydrogen fluoride catalyst containing not more than about 10% by weight of water in a second reaction zone, separating alkylation reaction products from the bulk of the used hydrogen fluoride catalyst, recycling at least a portion of said separated used hydrogen fluoride catalyst to the alkylation step, diluting another portion of said separated used hydrogen fluoride catalyst with water to cause separation of a layer of organic contaminants from aqueous hydrogen fluoride, withdrawing said organic contaminants from the system, and introducing said last named aqueous hydrogen fluoride into said first named hydrofluorination reaction zone.

7. A process for the alkylation of isoparaffinic hydrocarbons with olefinic hydrocarbons, and also with alkyl fluorides formed in the process as hereinafter set forth, which comprises contacting said isoparaffins and said olefins with a hydrogen fluoride catalyst under alkylating conditions, separating hydrocarbon reaction products from the bulk of the used hydrogen fluoride catalyst, recycling at least a portion of said used hydrogen fluoride catalyst to the alkylation step, diluting another portion of said used hydrogen fluoride catalyst with water whereby to separate organic contaminants from aqueous hydrogen fluoride, converting said aqueous hydrogen fluoride to alkyl fluorides by reacting it with olefinic hydrocarbons under hydrofluorinating conditions in a separate reaction zone, recovering alkyl fluorides from the reaction mixture, and introducing said alkyl fluorides into said alkylation step.

8. A process for the alkylation of paraffinic hydrocarbons to produce higher molecular weight derivatives thereof which comprises reacting olefinic hydrocarbons with isoparaffinic hydrocarbons under alkylating conditions in the presence of a hydrogen fluoride catalyst, separating hydrocarbon reaction products from the bulk of the used hydrogen fluoride catalyst, diluting at least a portion of said separated used hydrogen fluoride catalyst with water whereby to separate organic contaminants from aqueous hydrogen fluoride, withdrawing said organic contaminants from the system, reacting at least a portion of said aqueous hydrogen fluoride with olefinic hydrocarbons under hydrofluorinating conditions to form alkyl fluorides, separating alkyl fluorides and unconverted hydrocarbons from an aqueous layer, introducing said alkyl fluorides into said first named alkylation step to produce free hydrogen fluoride by the interaction of said isoparaffinic hydrocarbons and said alkyl halides, and employing said last named aqueous layer for the dilution of said separated used hydrogen fluoride catalyst as hereinbefore described.

9. A process for the alkylation of paraffinic hydrocarbons to produce higher molecular weight derivatives thereof which comprises reacting olefinic hydrocarbons with isoparaffinic hydrocarbons under alkylating conditions in the presence of a hydrogen fluoride catalyst, separating hydrocarbon reaction products from the bulk of the used hydrogen fluoride catalyst, diluting at least a portion of said separated used hydrogen fluoride catalyst with water to separate organic contaminants from aqueous hydrogen fluoride and withdrawing said organic contaminants from the system, reacting at least a portion of said aqueous hydrogen fluoride with olefinic hydrocarbons under hydrofluorinating conditions to form alkyl fluorides, introducing said alkyl fluorides into said alkylation step, introducing another portion of said aqueous hydrogen fluoride into a fractionation zone wherein substantially anhydrous hydrogen fluoride is separated overhead from a bottoms product comprising a mixture of hydrogen fluoride and water and returning said anhydrous hydrogen fluoride to the alkylation step.

10. A process for the alkylation of paraffinic hydrocarbons to produce higher molecular weight derivatives thereof which comprises reacting olefinic hydrocarbons with isoparaffinic hydrocarbons under alkylating conditions in the presence of a hydrogen fluoride catalyst, separating hydrocarbon reaction products from the bulk of the used hydrogen fluoride catalyst, diluting at least a portion of said separated used hydrogen fluoride catalyst with water whereby to separate organic contaminants from aqueous hydrogen fluoride, reacting at least a portion of said aqueous hydrogen fluoride with olefinic hydrocarbons under hydrofluorinating conditions to form alkyl fluorides, separating said alkyl fluorides and unconverted hydrocarbons from an aqueous layer, introducing said alkyl fluorides into said first named alkylation step, returning at least a portion of said last named aqueous layer to the aforesaid dilution, subjecting another portion of said first named aqueous hydrogen fluoride to fractionation whereby anhydrous hydrogen fluoride is separated overhead from a mixture of hydrogen fluoride and water, returning said anhydrous hydrogen fluoride to the alkylation step, and introducing another portion of said aqueous layer from said hydrofluorination step to said fractionation step.

11. The process of claim 9 wherein at least a portion of said substantially anhydrous hydrogen fluoride from said fractionation step is introduced into said hydrofluorination step.

12. The process of claim 9 wherein a portion of said anhydrous hydrogen fluoride is introduced into said alkylation zone and another portion thereof is introduced into said hydrofluorination zone.

13. The process of claim 9 wherein the bottoms product from said fractionation step comprises a constant boiling mixture of hydrogen fluoride and water.

14. A process for the production of saturated motor fuel which comprises contacting a substantial molar excess of isoparaffinic hydrocarbons with mono olefins in the presence of a catalyst whose essential active ingredient is hydrogen fluoride at a temperature of from about $-30$ to about $100°$ C. under sufficient pressure to maintain the reactants and catalyst in substantially the liquid phase, separating hydrocarbon reaction products from the bulk of the used hydrogen fluoride catalyst, subjecting said hydrocarbon reaction products to fractionation to separate desired alkylation products from unconverted hydrocarbons and light gases, recycling unconverted isoparaffins to the alkylation step, recycling at least a portion of said separated used hydrogen fluoride catalyst to the alakylation step, diluting another portion of said separated used hydrogen fluoride catalyst with water to separate organic contaminants from aqueous hydrogen fluoride, reacting at least a portion of said aqueous hydrogen fluoride with mono olefinic hydrocarbons at a temperature of from about $-30$ to about $100°$ C. under sufficient pressure to maintain the reactants in substantially the liquid phase and in the presence of a substantial molar excess of hydrogen fluoride over olefins to form alkyl fluorides, and introducing said alkyl fluorides to said first named alkylation step to therein produce free hydrogen fluoride by the interaction of said isoparaffinic hydrocarbons with said alkyl halides.

15. The process of claim 4 wherein isobutane is reacted with butenes in said alkylation step.

16. The process of claim 4 wherein isobutane is reacted with propene in said alkylation step.

17. The process of claim 4 wherein isobutane is reacted with pentene in said alkylation step.

18. The process of claim 1 wherein said contaminated catalyst is diluted with sufficient water to form aqueous hydrogen fluoride containing from about 60 to about 80% by weight of hydrogen fluoride.

CARL B. LINN.